US005925436A

United States Patent [19]

Voss

[11] Patent Number: 5,925,436

[45] Date of Patent: Jul. 20, 1999

[54] MAGNETIC SHEETING FOR PARTLY COVERING VEHICLE BODYWORK PORTIONS

[75] Inventor: Klaus-Wilhelm Voss, Uetersen, Germany

[73] Assignee: Vosschemie GmbH, Uetersen, Germany

[21] Appl. No.: 08/786,267

[22] Filed: Jan. 22, 1997

[30] Foreign Application Priority Data

Oct. 12, 1996 [DE] Germany ........................... 296 17 724

[51] Int. Cl.[6] ................................ B32B 3/04; G11B 5/66

[52] U.S. Cl. .......................... 428/121; 428/122; 428/130; 428/141; 428/142; 428/156; 428/195; 428/202; 428/694 T; 428/694 B; 428/900

[58] Field of Search ............................ 428/694 T, 694 B, 428/900, 121, 122, 130, 141, 142, 156, 195, 202

[56] References Cited

FOREIGN PATENT DOCUMENTS

| | | | |
|---|---|---|---|
| 0 518 403 A1 | 5/1992 | European Pat. Off. ........ | B05B 15/04 |
| 0518403 | 9/1992 | European Pat. Off. . | |
| 296 17 724 | 11/1996 | Germany ....................... | B05B 15/04 |
| 61-257259 | 11/1986 | Japan ............................. | B05B 15/04 |
| 1 221 199 | 3/1971 | United Kingdom .............. | H01F 7/00 |

*Primary Examiner*—Leszek Kiliman
*Attorney, Agent, or Firm*—Friedrich Kueffner

[57] ABSTRACT

The magnetic sheeting (10) for partly covering gaps of adjoining bodywork portions of vehicles and such surface areas not possessing any radii of curvature, is substantially tape-like configured and possesses a folding or kink line (11) proceeding along the longitudinal extension of the latter as well as several incisions (14) located transversally to this kink line (11).

12 Claims, 3 Drawing Sheets

10(20)
11
12
13
14
15
30
40
41
42
VI

MAGNETIC SHEETING FOR PARTLY COVERING VEHICLE BODYWORK PORTIONS

The invention relates to a magnetic sheeting for partly covering vehicle bodywork portions.

BACKGROUND OF THE INVENTION

If, by way of example, a motor vehicle fender is to be re-enamelled, first of all grinding operations and, later, the application of various layers of enamel have to be effected. For this, the parts adjacent to the fender, such as the door, the boot lid or the engine hood, have to be covered in order to avoid inadvertent mechanical damage or an undesirable application of a primary coat or of an enamel. The surface areas not to be treated, particularly the adjoining edges, are regularly covered with a thick adhesive tape, which is subject to the disadvantage that, subsequent to the removal of the adhesive tape, possible bonding agent residue has to be gotten rid of. Over and above that, the adhesive tape only offers an inadequate protection from possible damage since, especially when the part to be reenamelled later is ground, it is not always possible to preclude a destruction of the adhesive tape, whereby the vehicle enamel which was intended to be protected by the adhesive tape, is also detrimentally affected. Further problems arise from the only partly existing ultimate tensile strength of the adhesive tape.

That is why in the documents of the utility model G 90 00 990.8, a stencil has already been proposed which may be comprised of a flexible material, such as plastic or spring steel sheet and which is to be attached to the vehicle surface area with the aid of spacers which, at the same time, are fastening elements. The spacers may be suction cups, adhesive rubbers, adhesive tapes or magnets. The stencil possesses any external configuration whatever with a central recess and is essentially intended to serve for keeping the area to be cleared for enamelling—which is determined by the recess—as small as possible. Apart from the fact that this stencil is unsuitable for the covering of edges, it can only be employed in the form of an enamelling aid.

In the documents of the utility model DE 93 12 975.0, a covering for the protection of surface areas and add-on parts not to be treated when working on adjoining bodywork portions of motor vehicles that are interrupted by beads, edges, gaps or suchlike is proposed which, between two sheetings, is provided with a magnetic sheeting. However, the hereby multi-layered covering is of relatively rigid construction and only suitable for being placed upon plane or, at the most, slightly curved surface areas possessing a large radius of curvature. With this, an engagement about a door edge with an all-over edge contact is not possible so that also in this case one has to fall back upon adhesive tapes or the like.

It is the technical problem of the present invention to state a magnetic sheeting, with the aid of which bodywork portions adjoining to gaps, more particularly their edges, can be covered adequately and safely from damage, in which case the magnetic sheeting is intended to be also suitable for covering such surfaces which possess small radii of curvature.

SUMMARY OF THE INVENTION

This technical problem is resolved by the magnetic sheeting according to claim 1, which is characterized in that it is substantially tape-like in configuration and possesses a folding or kink line proceeding along its longitudinal extension as well as several incisions located transversally to said kink line.

This magnetic sheeting is suitable for being inserted with one of its sides into a slot to be found e.g. between a fender and a door, after which the other side is offset along the kink line until the magnetic sheeting (depending on what is to be covered) adhesively covers the door or fender region on this surface area. In addition, the incisions located transversally to this kink line provide a stabilization of the sheeting in such a way that also marked curvatures, such as do exist at the front or in the rear of a motor vehicle, can be pertinently encompassed, which would not be possible with an all-over rectangular magnetic sheeting. By means of the incisions it is possible to adequately construct the magnetic sheeting segments located therebetween so as to be able to offer sufficient protection even in aggressive grinding operations or similar machining. The individual segments of the magnetic sheeting, which, on the one hand, are delimited by the incisions, or, on the other hand, by the edge, can consequently be constructed in a rigid fashion and, thereby, resistant to destruction. The folding or kink line can be prepared by a relevant material weakening, possibly by means of a notch.

Further developments of the magnetic sheeting are described in the subclaims.

The incisions are thus preferably located on both sides of the kink line and, beyond the one side of the kink line opposite the incisions offset relative to each other beyond the other side of the kink line. This form of construction provides an enhanced durability of the magnetic sheeting tape since the incisions located on opposite sides do not lie in one line. More particularly, according to another embodiment of the invention, the incisions may in each case reach as far as the kink line. In order to improve the ultimate tensile strength of the magnetic sheeting within the region of the incision ends on the kink line, the incisions terminate in a graduated circle arch or in a pitch-circular punched out portion.

According to a further construction of the invention, the incisions are, on the side opposite the incisions on the other side of the kink line, reciprocally offset by half of the dimension which is formed by the distance between two incisions on the same side. This step provides a flexibilization which is uniform along the entire length of the magnetic sheeting tape.

In order to take the circumstance into consideration that the gap into which the one part of the magnetic sheeting tape side is to be inserted, only possesses a limited depth, the kink line is disposed asymmetrically to the width of the magnetic sheeting while forming shorter and longer tabs on oppositely located sides.

In order to provide a secure support for the in each case longer tab on the bodywork surface area, the regions on both sides of the kink line are foldable through approximately 90° to 100°.

By means of the 90° folding, a secure retention of the magnetic sheeting tape in the gap is ensured. Due to the configuration of the mutually offset incisions in the magnetic sheeting tape right into the corners of the 90° folding, an adaptation to bodywork contours is possible in one direction only with a merely flat magnetic sheeting. Both a curved contour of the gap as well as rounded-off portions of the bodywork can be included.

Over and above that, the magnetic sheeting is additionally provided in the wide tab in each case with a point-for-point or selective application of an adhesive agent that can be removed again or with an adhesive tape coated on both sides which, if required, the user is able to renew himself when the adhesive power falls off or when the adhesive has become badly worn.

In a further construction of the invention the tabs located between two incisions, toward the outside, are constructed so as to be narrower so that, in the event of a pertinent contact of the tabs within a concave region, no overlapping of the individual magnetic sheeting tabs takes place, by preference, said tabs are essentially constructed so as to be trapezoidal or so as to possess rounded-off edges.

Magnetic sheetings that can be employed as material are known according to the state of the art, e.g. in the form of adhesive advertising signs. According to the present invention, magnetic sheetings are preferably used which possess an external plastic coating, whereby damage to the magnetic sheeting can be prevented in repeated applications just as a possible scratching of enamel surface areas by the metallic magnetic sheeting is prevented.

BRIEF DESCRIPTION OF THE DRAWINGS

Embodiments are depicted in the figures. Thus

DETAILED DESCRIPTION OF THE PREFERRED EMBODIMENT

Figure 1:
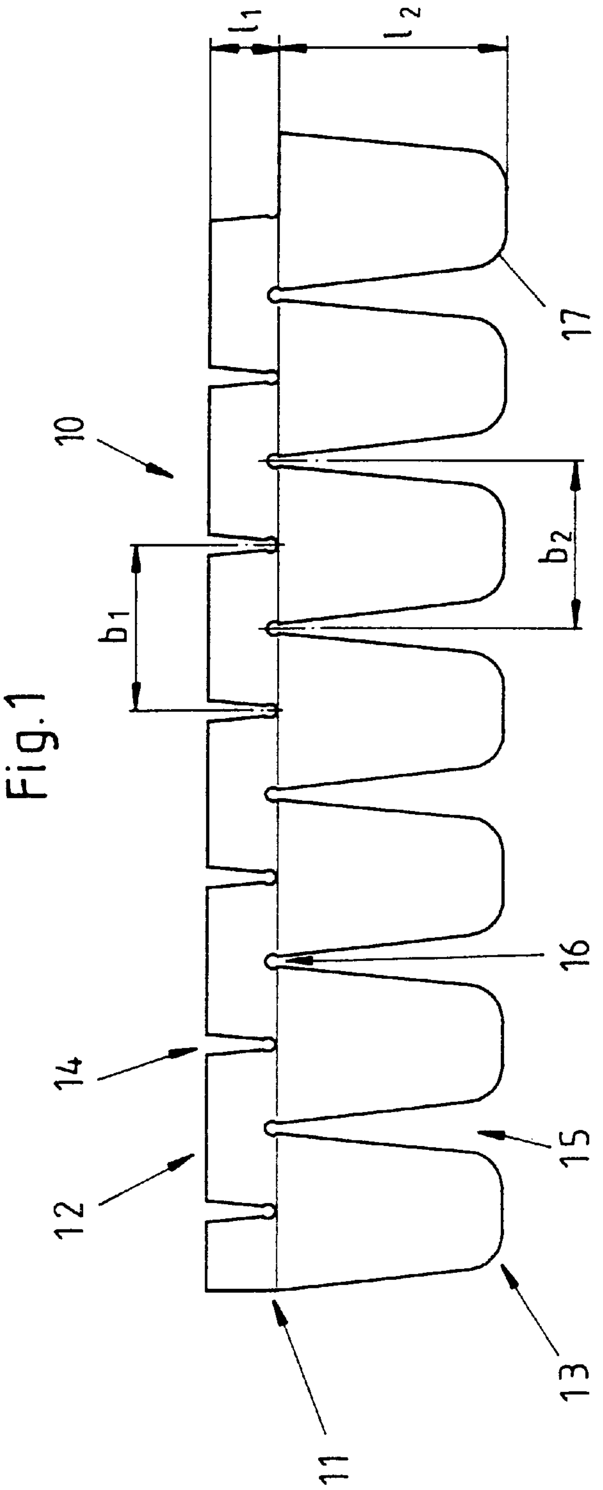
FIGS. 1 and 2 each show views from the top onto the magnetic sheeting according to the invention possessing different dimensioning.
Figure 2:
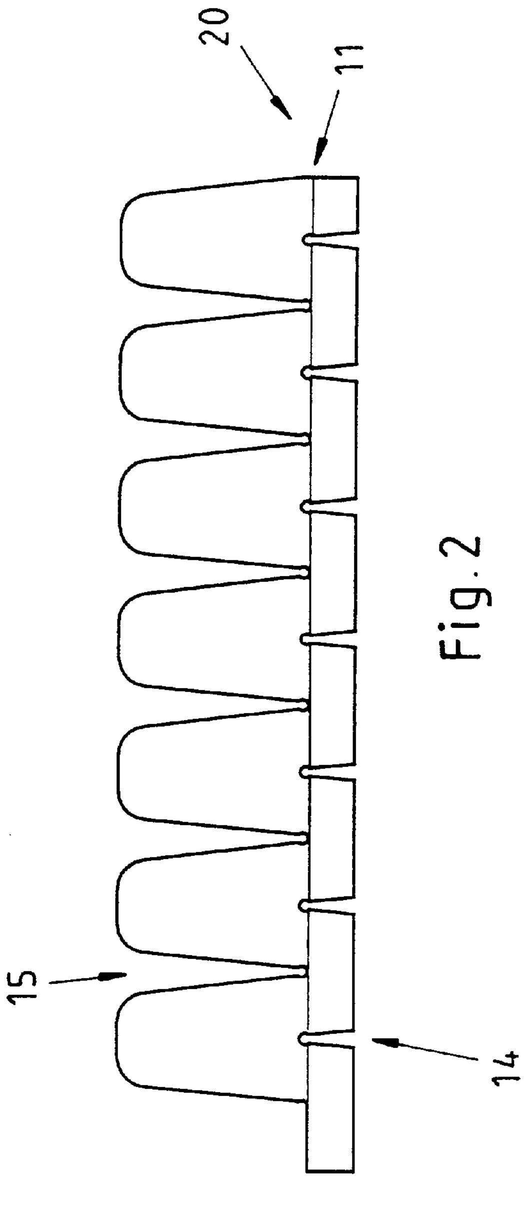
Figures 5, 6, 7:
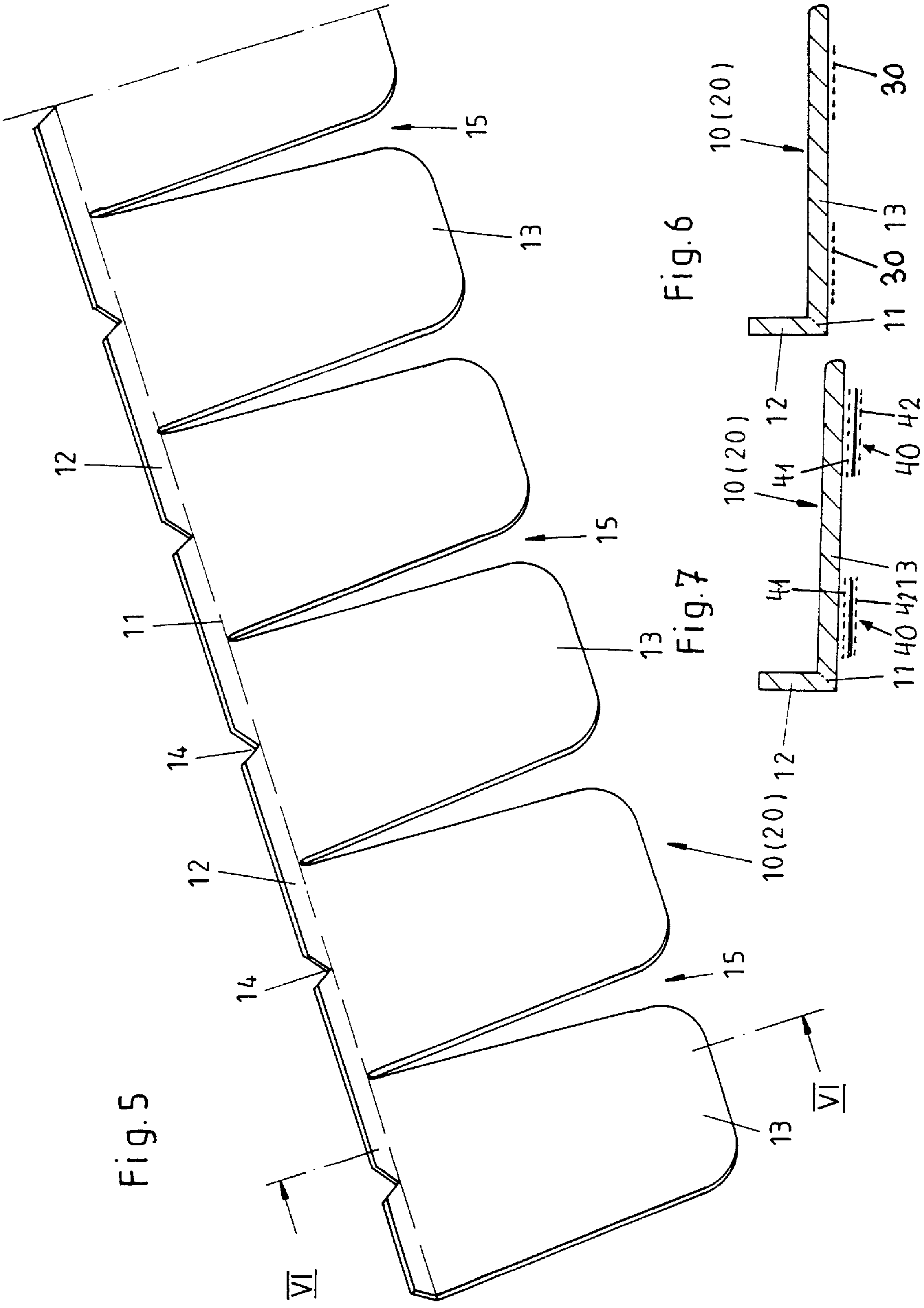
FIG. 5 shows a diagrammatical view of the manetic sheeting with folded longitudinal area.
FIG. 6 shows an enlarged vertical section in the direction of line IV—IV in FIG. 5 with a point-for-point application of a readily removable adhesive agent on the contact and adhesion side of the larger and wider tab of the magnetic sheeting.
FIG. 7 shows an enlarged vertical section in the direction of line VI—VI in FIG. 5, however, with a point-for-point application of a bilaterally adherent adhesive tape on the contact and adhesive side of the larger and wider tab of the magnetic sheeting.

The magnetic sheetings 10 and 20 or the magnetic sheeting tapes or strips illustrated in FIGS. 1 and 2 are foldable or folded through 90° along a kink line 11 (FIGS. 5 and 6). On both sides of this kink line, each with a different length $1_1$ or $1_2$, respectively, tabs 12 and 13 are formed which, by means of respective incisions 14 or 15, delimit laterally or the kink line 11, respectively. The width $b_1$ or $b_2$ of the tabs 12 and 13 measured at the foot, i.e. at the level of the kink line 11, is preferably identical in size and can, depending upon the embodiment in question, be 4 cm (FIG. 1) or 3 cm (FIG. 2). This applies correspondingly to the length dimension $1_1$, which may be uniformly 1 cm in the embodiment examples as per FIGS. 1 and 2, whereas the length $1_2$ may be 6 cm (embodiment example as per FIG. 2). The incisions 14 and 15 terminate within the area of the kink line in a circular cutout 16. The incisions 14 and 15 are in each case offset relative to each other by half a horizontal dimension $b_1$, $b_2$ so that the incisions 14 and 15 are not oppositely located. The smaller tabs 12 are essentially constructed so as to be trapezoidal inshape, but they may also, as becomes. apparent with the aid of tabs 13, possess rounded-off corners 17. Over the longitudinal extension (in FIGS. 1 and 2 from the left to the right), the magnetic sheetings 10 and 20, both in the sheet plane of the illustration as well as in the vertical direction thereto, are pliantly flexible while forming a desired line of curvature.

Figure 3:
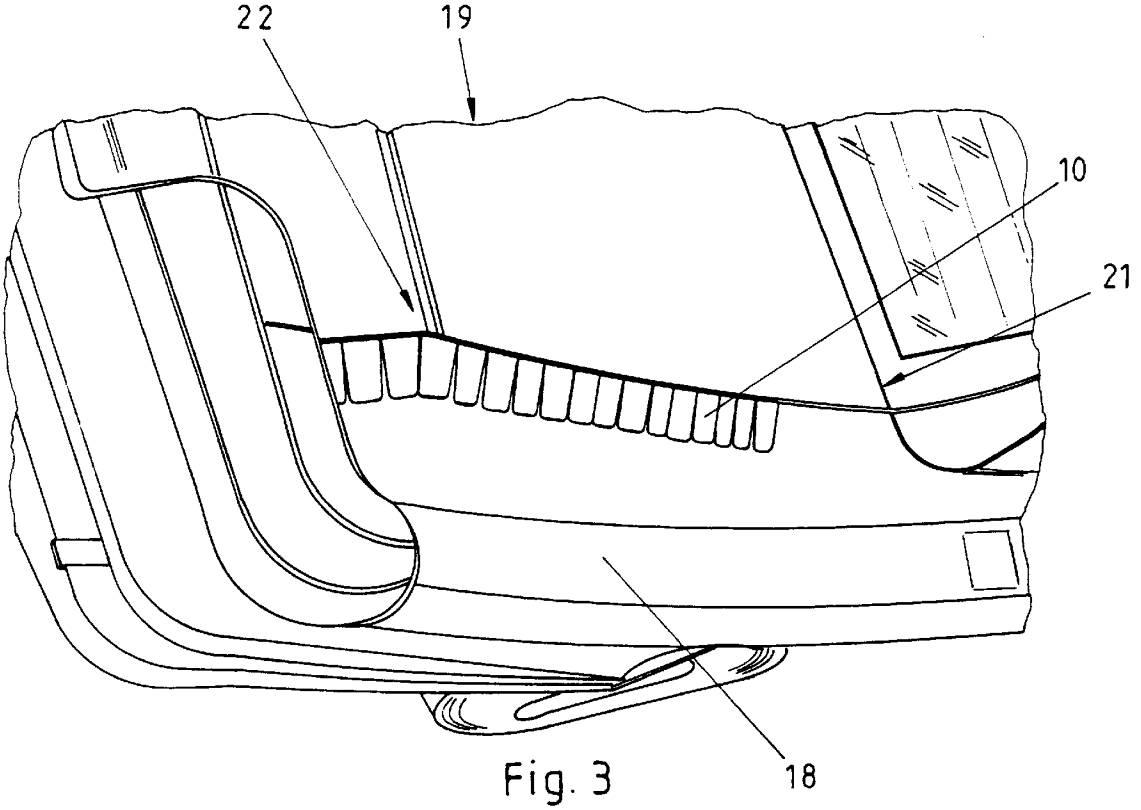
FIGS. 3 and 4 each show applications of these magnetic sheetings for the partial covering of motor vehicle bodywork surface areas.

A first application example in FIG. 3 depicts the covering of a motor vehicle fender 18 with a magnetic sheeting 10, for instance, when a boot lid 19 (without dismantling) is to be treated. The magnetic sheeting 10 is inserted with its tab 12 into the slot 21 between the boot lid 19 and the fender 18 and is folded back along the kink line 11 so that the tabs 13, which are merely visible in FIG. 3, come to rest upon the fender surface area. Even within the region of sharp-edged curvatures 22, on account of the incisions 15, the flexibility of the magnetic sheeting 10 suffices to ensure that all tabs 12 come to rest upon the fender 18.

Figure 4:
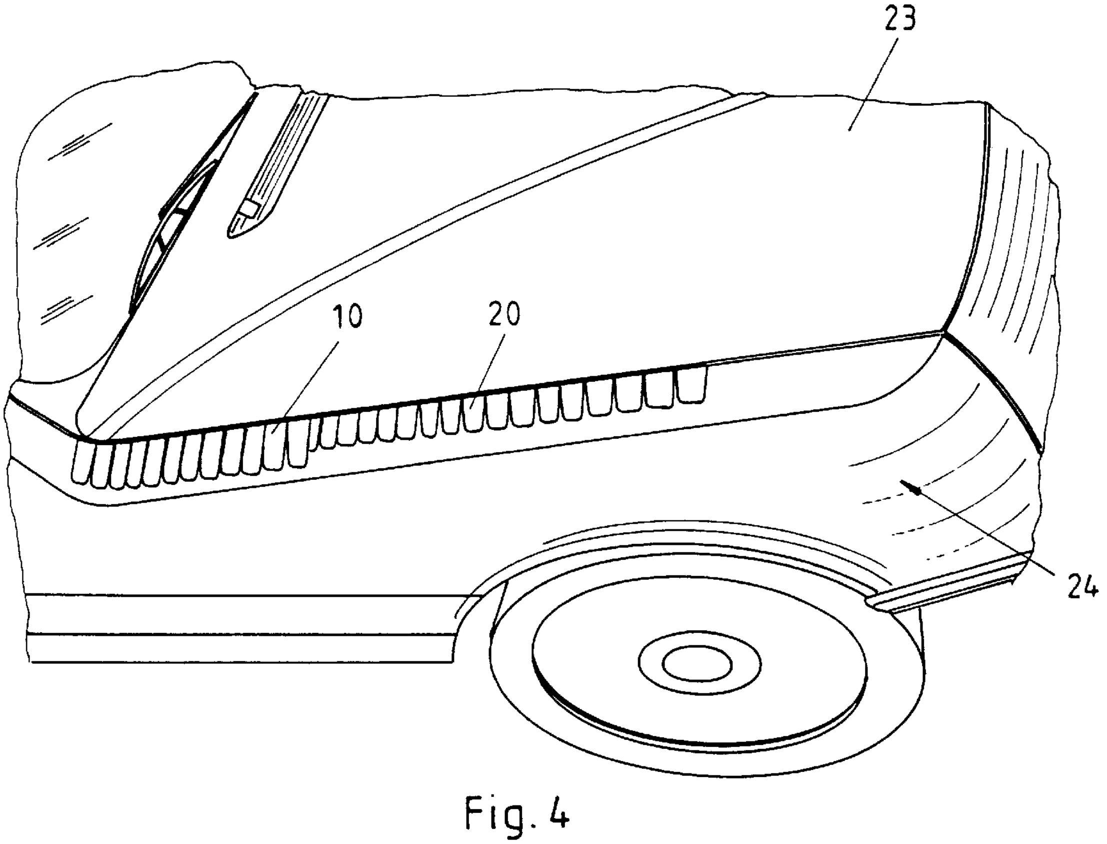

When an engine hood 23 (without dismantling) is to be treated, the fender 24 is protected in a corresponding manner, while in the present case differently dimensioned sheetings 10 and 20 are strung together, inserted and turned over in the manner described in connection with FIG. 3. The flexibility of the magnetic sheeting 10 or 20 does therefore ensure the covering of both convexly as well as of concavely configured boundary or contact areas. As can be gathered from the FIGS. 3 and 4, the fender edge adjacent to the boot lid 19 or the engine hood 23 is reliably protected.

In addition, the larger and wider tabs 13 of the magnetic sheeting 10,20 may, on their surfaces, be provided with a selective application 30 of a an adhesive agent that is readily removed again (FIG. 6) or with a selective application of a bilaterally adhering adhesive tape 40 (FIG. 7), whose two adhesive coatings are identified with 41,42. This selective or pointwise application of an adhesive increases the adhesive strength of the magnetic sheeting in the applied state and, over and above that, also makes the employment of the magnetic sheeting possible on non-metallic bodywork portions or surfaces. The use of a readily removable adhesive enables one to detach a magnetic sheeting 10,20 adhering to a surface once more without that any adhesive residue is left adhering to the bodywork surface area.

What is claimed is:

1. Magnetic sheeting (10, 20) for covering a body-work portion (18, 24) of a vehicle, wherein the magnetic sheeting (10, 20) comprises:

a magnetic sheet material having a kink line (11) extending along a length of the magnetic sheet material; and a first tab portion, said tab portion defined by a plurality of incisions (14, 15) located transversely to said kink line (11).

2. Magnetic sheeting according to claim 1, wherein the incisions (14, 15) are located on both sides of the kink line (11) to form said first and a second tab portion, said incisions of said first tab portion are reciprocally offset in relation to the incisions (15) of said second tab portion.

3. Magnetic sheeting according to claim 1, wherein said incisions (14, 15) extend to the kink line (11).

4. Magnetic sheeting according to claim 3, wherein said incisions (14, 15) terminate at an end to define a graduated circle arch (16).

5. Magnetic sheeting according to claim 1, wherein said incisions (14, 15) are equidistantly disposed on each of said first and second tab portions.

6. Magnetic sheeting according to claim 5, wherein the distance ($b_1$) between the incisions (14) of the first tab portion is equal to the distance ($b_2$) between the incisions (15) of the second tab portion and wherein the incisions (14) on the first tab portion, are reciprocally offset from the incisions (15) of the second tab portion.

7. Magnetic sheeting according to claim 2, wherein the kink line (11) is asymmetrically disposed relative to width ($1_1$+$1_2$) so that said first tab portion (12) is shorter than said second tab portion (13).

8. Magnetic sheeting according to claim 7, wherein said first tab portion is foldable in relation to said second tab portion along an angle of 90° to 100°.

9. Magnetic sheeting according to claim 7, wherein said first and second tab portions become narrower in a direction extending away from said kink line and are preferably constructed so as to be substantially trapezoidal in form with rounded-off edges (17).

10. Magnetic sheeting according to claim 7, further comprising an external plastic coating.

11. Magnetic sheeting according to claim 7, wherein said magnetic sheeting further comprises a contact surface and said second tab portion (13) is larger and wider than said first tab portion (12) of the magnetic sheeting (10;20), whereby said second tab portion is provided with a selective application (30) of an adhesive agent on said contact surface which can be readily removed without any adhesive residue from said adhesive agent adhering to said body-work portions of vehicles.

12. Magnetic sheeting according to claim 7, wherein said magnetic sheeting further comprises a contact surface and said second tab portion (13) is larger and wider than said first tab portion (12) of the magnetic sheeting (10;20), whereby said second tab portion, is provided with a selective application of an adhesive tape (40) on said contact surface, said adhesive tape having on both sides a layer of adhesive (41, 42).

* * * * *